United States Patent Office.

JOHN S. BARDEN, OF PROVIDENCE, RHODE ISLAND.

Letters Patent No. 94,936, dated September 21, 1869.

IMPROVED ALLOY FOR MAKING WATER-METERS.

The Schedule referred to in these Letters Patent and making part of the same.

*To all whom it may concern:*

Be it known that I, JOHN S. BARDEN, of the city and county of Providence, in the State of Rhode Island, have invented an Improvement in Water-Meters; and I do hereby declare that the following specification is a full, clear, and exact description thereof.

The object of my invention is not to present a new mechanism for measuring water, but consists in making a meter from metal which shall not affect the purity of the water passing through it, and at the same time render it capable of manufacture at a cost which shall place it within the means of all classes of people.

Water-meters have heretofore been constructed from iron, brass, or bronze-metal, all, however, being open to serious objections. Iron, on account of rust, soon becomes inoperative. Brass and bronze-metal, from their tendency to corrode, render the water impure and unhealthy, and all three are practically of no value. The expense of manufacture of the smallest size places them beyond the reach of people of ordinary means.

Since the introduction of water into the principal cities of the country, it cannot be denied that the necessity of measuring water is equal to that of gas.

The present method of measuring water is usually by the size of the pipe or cock, which is in reality capable of furnishing no definite knowledge as to the amount of water used. Thus, much injustice is done to consumers, from the fact that while one pays for much less than he has, another pays for much more.

I propose to manufacture a water-meter from metal of a peculiar character, which shall not corrupt the water, and at the same time shall not in cost of manufacture be beyond the means of all classes of people, or too great a burden upon any company or corporation who may desire to furnish them to consumers, (the same as gas-meters are now furnished,) a family size not exceeding in cost the sum of two dollars.

I make use of a metal for this purpose which is composed of tin and zinc in combination. The proportions which I have found to be the best are two parts zinc and one of tin, with sufficient antimony to make the metal of the proper hardness.

In the manufacture of water-meters now in use and before referred to, the various parts are cast in sand-moulds, after which they are taken to the work-shop, where, after much machine and hand-labor, they are brought to a degree of perfection which will warrant their adjustment to each other. This slow and expensive labor so enhances the cost of the meter as to place it beyond the means of those who need it most, and renders it a useless article to the general public. But the metal before described, resulting from the combination of tin and zinc, from its peculiar character, is fusible at low heat, so that the parts may be cast in polished metal moulds with such accuracy and smoothness as to remove the necessity of taking them to a work-shop to be finished, or even for the purpose of cutting a screw-thread, as the same is cast upon the parts when required, so that they may, upon coming from the mould, be immediately put together and a perfect machine thus formed. I therefore conclude that the use of this metal for this purpose must not only result in a useful invention to a few, but a great public benefit.

What I claim as my invention, and desire to secure by Letters Patent, is—

A water-meter, made from metal composed of the elements and possessing the characteristics substantially as described.

JOHN S. BARDEN.

Witnesses:
W. B. VINCENT,
JOHN D. W. TAYLOR.